United States Patent [19]

Füwesi

[11] Patent Number: 4,527,039
[45] Date of Patent: Jul. 2, 1985

[54] METHOD AND APPARATUS FOR INNER LINING METALLIC BEARING LUGS

[76] Inventor: Peter Füwesi, Zeilweg 7, 6951 Schefflenz-U., Fed. Rep. of Germany

[21] Appl. No.: 472,038

[22] Filed: Mar. 4, 1983

[30] Foreign Application Priority Data

Mar. 6, 1982 [DE] Fed. Rep. of Germany ....... 3208146

[51] Int. Cl.³ .............................................. B23K 9/04
[52] U.S. Cl. .................................. 219/76.14; 219/76.1
[58] Field of Search ................. 219/76.1, 76.12, 76.14, 219/76.15; 228/119

[56] References Cited

U.S. PATENT DOCUMENTS

| | | | |
|---|---|---|---|
| 2,912,562 | 11/1959 | Donovan | 219/76.14 X |
| 4,068,791 | 1/1978 | Scholtus et al. | 219/60 A |
| 4,215,809 | 8/1980 | Davis | 219/76.14 X |
| 4,242,981 | 1/1981 | Bernard et al. | 219/76.1 X |

Primary Examiner—Roy N. Envall, Jr.
Assistant Examiner—C. M. Sigda
Attorney, Agent, or Firm—Peter K. Kontler

[57] ABSTRACT

To repair worn-out bearing lugs of iron bolt bearings, excess material is applied to the bearing surface by means of a welding head rotating inside the bearing lug. This material then is turned down to the regular bearing surface.

7 Claims, 13 Drawing Figures

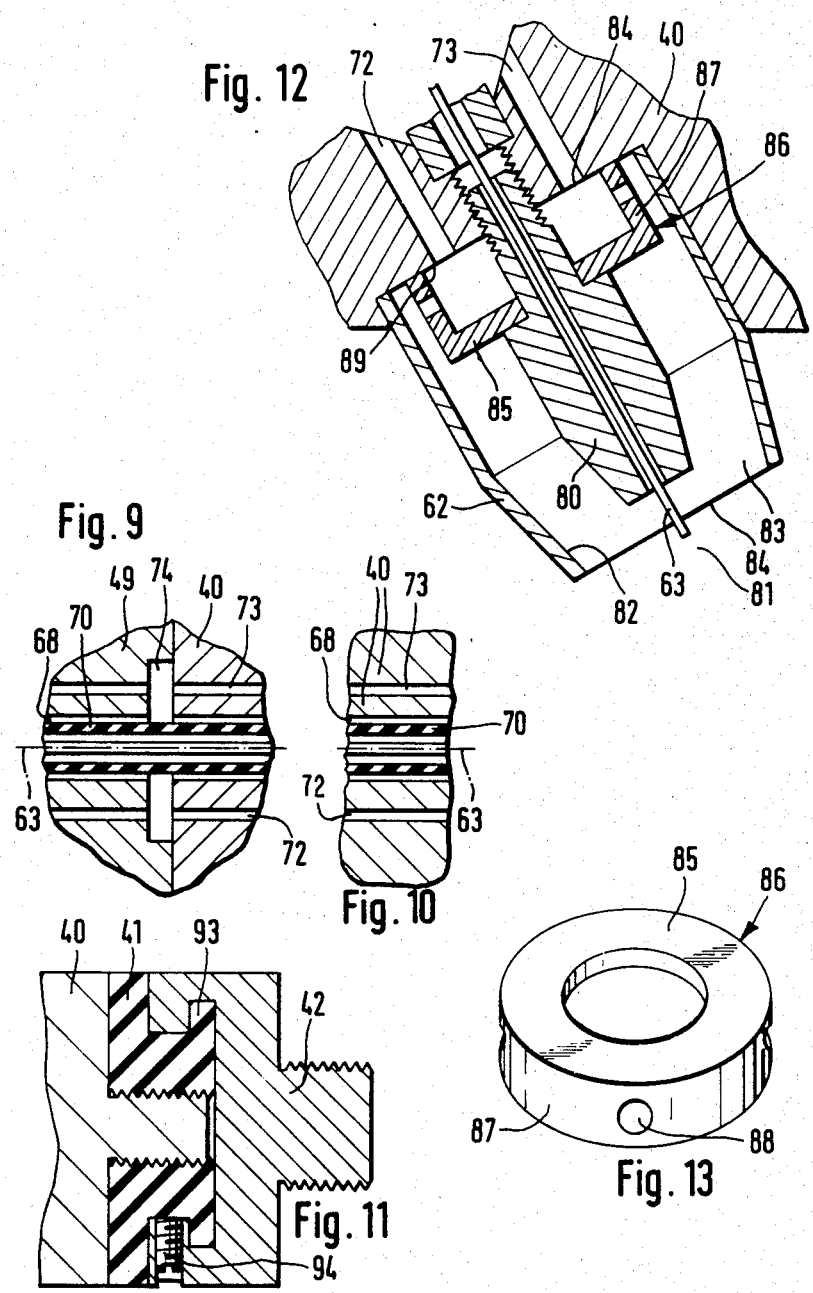

METHOD AND APPARATUS FOR INNER LINING METALLIC BEARING LUGS

BACKGROUND OF THE INVENTION

The invention relates to a method of inner lining bearing lugs of metal, preferably iron bearing parts, and to an apparatus which constitutes or comprises a welding head and can be used for the practice of the method.

The term bearing lugs is intended to denote not only the bearing lugs of bolt bearings but also other parts having circular cylindrical holes and being subject to wear and tear by engaging parts during operation.

Depending upon the normally high mechanical, often even one-sided strain, the bolt bearings of heavy metal devices are subjected to pronounced wear and tear. Normally, the wear upon the bolt can easily be repaired by inserting a new bolt. The wear upon the bearing lugs leads to worn-out lugs. For the repair it is known to enlarge the opening of a worn-out lug, and then to weld into the enlarged opening a prefabricated bearing sleeve or socket to thus provide a restored bearing lug. Such repair of the lug requires a great deal of energy and also leads to unwanted warping of the bearing bows of the respective lugs as a result of the necessary welding. The bearing sleeve has to consist of relatively soft iron because, if it is high-grade tempered, it snaps off the welding. This, however, entails a more pronounced wear and tear upon the newly installed bearing lug.

OBJECTS AND SUMMARY OF THE INVENTION

The invention has for its object to develop a method and a welding head in such a way that the inner-lining of the bearing lugs can be carried out in a simple manner and that warping of the surrounding portions of bearing lugs can be avoided.

The novel method is characterized in that the bearing lug is drilled to exhibit a coaxial bore, that excess material is thereupon applied to the drilled bearing surface of the lug in the form of fillets or fillet cycles side by side to form at least one layer, and that subsequently the thus applied material is removed to the extent which is necessary to reestablish the original bearing surface.

Since the applied material is in the form of a welded fillet, the bearing bow is subjected to less pronounced thermal stresses than by welding in a spare socket, so that thermally induced warpings are easily avoidable by choosing relatively small individual fillets.

If an applied fillet layer is not sufficient for the application of requisite quantities of excess material, a second fillet layer and further fillet layers can be applied thereon. The material which is applied in the form of fillets can be much harder than the material of the sockets which are welded in the known manner and the fillets do not snap off. The fillets of greater hardness provide a harder bearing surface on the lug.

The invention is not only useful for the repair of worn-out bearing lugs but also for the production of bearing lugs. In such a case, the first step involves the making of a bearing lug having an inner diameter which is larger than necessary, the internal surface of such lug is then coated by welding of excess material thereon, and afterwards the surplus is removed by turning so that the lug exhibits the desired inner diameter. If a hard material is used for welding, one obtains a bearing lug which has an especially hard bearing surface on the welded inner lining and, therefore, the lug is less prone to wear and tear.

The fillet layer can be produced by axially extending fillets. It is, however, easier to form a fillet layer from a fillet which is applied helically around the lug axis because such fillet layer can be applied without interruption in one single welding operation.

In order to remove material from the bearing lugs down to the regular bearing surface, the lathe has to be centered with reference to the bearing axis. The same mode of centering can be resorted to for the application of the fillets by means of a rotating welding head. A further feature involves the center-bracing of a centering rod or support in the coaxial bearing lugs of a bolt bearing by means of conical tension clamps fixed to the lugs, centering a welding device or a combined welding device and lathe by attaching it to the centering rod, aligning the centered device with the bearing bows of the respective lugs outside of the lugs, removing the centering rod, and using the centered device for welding and, if necessary, turning.

The once centered device can be used for the application of material by fillet welding and for boring up to the regular bearing surface by employing a combined welding device and lathe in which a welding head or a lathe head can be installed. If separate devices are used for welding and lathing, it is recommended to attach exchangeable devices to the holders, so that the once attached holder can be used either for the one or the other device. In both cases the necessary helical feed can be controlled by a guiding thread.

In order to apply a fillet layer by means of a helical fillet in one uninterrupted welding process, a welding head is required the welding nozzle of which is guided on a corresponding helical course.

The invention is applicable in connection with the treatment of bolt bearings of heavy machines, preferably bolt bearings the stress upon which is within the weight range of 100 kilograms and more. Such bolt bearings can constitute tumbler bearings for controlling arms which move towards one another and so forth. However, rotary bearings are also suitable. Preferred fields of application are given to heavy building machines as well as heavy military equipment.

BRIEF DESCRIPTION OF THE DRAWING

FIG. 9 shows the structure within the phantom-line ellipse IX of FIG. 8;

FIG. 10 shows the structure within the phantom-line ellipse X of FIG. 8;

FIG. 11 is a view as seen in the direction of arrow XI in FIG. 8;

FIG. 12 is a sectional view of the welding nozzle which is shown in FIG. 8; and

FIG. 13 is a perspective view of a ring in the structure of FIG. 12.

DESCRIPTION OF THE PREFERRED EMBODIMENTS

Figure 1:
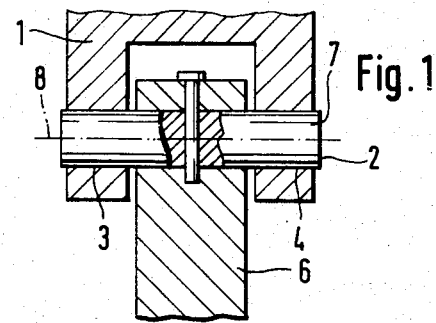
FIG. 1 is a sectional view of a bolt tumbler bearing

In the drawing, the reference character 1 denotes a bifurcated iron bearing arm of a bolt tumbler bearing with two bearing lugs 3 and 4 in which an iron bearing bolt 7, attached to a bearing arm 6, is mounted to swivel about the axis 8. When the bearing lugs 3 and 4 are worn, and are to be repaired the bearing arm 6 with the bearing bolt 7 is removed so that the bearing lugs are accessible.

For the purpose of centering a centering rod 5 is fastened in two coaxial tension clamps 9, 10 so that its axis coincides with the axis 8. Straps 11 to 14 are welded to the bearing arm 1 to support a combined welding device and lathe 15, which faces the centering rod 5, and an intermediate bearing 16. The device 15 can operate a lathe head 31 or a welding head 25. The welding head 25 is operated electrically with protective gas.

Figure 2:
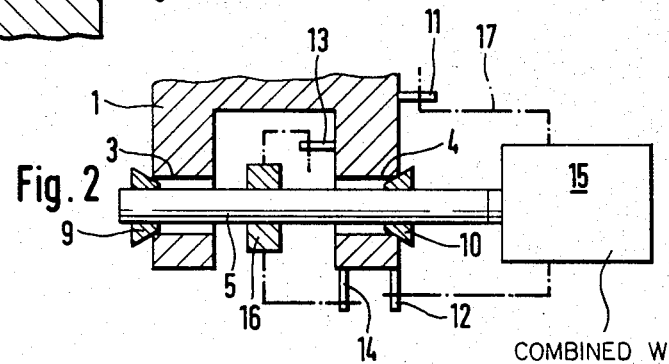
FIG. 2 shows one arm of the bearing of FIG. 1 with a centered combined welding device and lathe.
Figure 3:
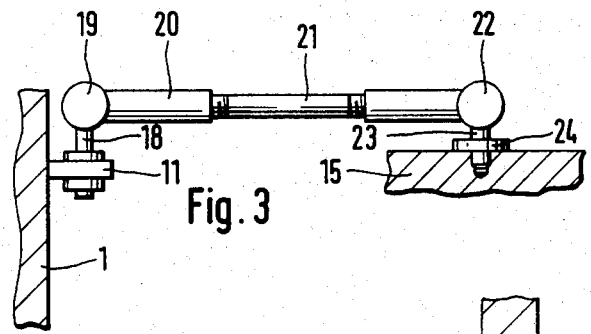
FIG. 3 shows an adjustable fastening which in FIG. 2 is merely indicated by phantom lines.
Figure 4:
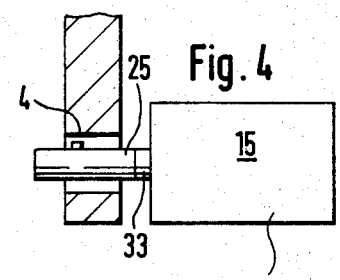
FIG. 4 shows the centered device of FIG. 2 in the course of the welding operation.
Figure 5:
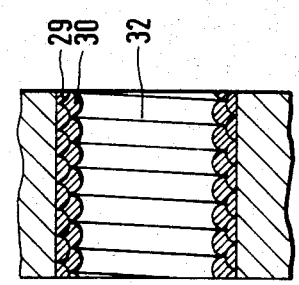
FIG. 5 shows the centered device of FIG. 2 during removal of material.

In FIG. 2, the mechanical connections between the straps 11 to 14 on the one hand, and the device 15 and the intermediate bearing 16 on the other hand are indicated by phantom lines. FIG. 3 shows by way of example the details of a connection corresponding to that which is indicated by the phantom line 17.

The strap 11 is bolted to a cross-arm 18 for a joint 19 which supports a screw socket 20 for swiveling movement about two intersecting axes. A screw bolt 21 is screwed into the socket 20 to a desired extent. The screw bolt 21 is hinged to a cross-arm 23 by a joint 22 which enables the bolt 21 to swivel about two intersecting axes. The cross arm 23 has a flange 24 and is connected to the casing of the device 15. The joints 19 and 22 can be arrested in any desired position by elements which are not shown so that a firm, inflexible, solid connection between the strap 11 and the device 15 can be established upon centering of the device 15.

After the device 15 and the intermediate bearing 16 are adjusted with reference to the bearing axis 8, a welding head 25 is mounted on the device 15 to apply excess material in the form of a coil whose axis coincides with the axis 8. The coil consists of one or several welding fillet layers.

Figure 6:
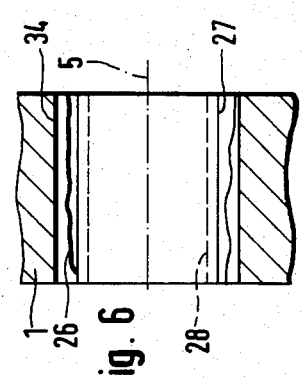
FIG. 6 is a sectional view of a worn bearing lug.
Figure 7:
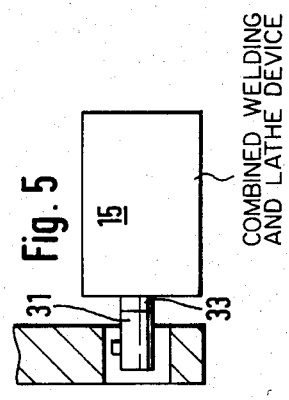
FIG. 7 shows the bearing lug of FIG. 6 subsequent to the application of excess material.

In FIG. 6 the worn bearing surface of the lug 4 is indicated by the character 26. The regular bearing surface is denoted by the line 27. In the first step, the lug 4 is drilled to provide therein a coaxial borehole 34. Then surplus material is applied all the way to the dotted line 28. This is achieved by applying two fillet layers 29, 30 as shown in FIG. 7. Each fillet layer consists of a single fillet 32 which is coiled around the axis 8 and the fillet passages of which are lap-welded side by side so that an uninterrupted application of the material is achieved.

After the application of material is completed, the welding head 25 is exchanged for the lathe head 31 and, with the device 15 remaining coaxially adjusted, the excess material is removed down to the regular bearing surface according to line 27.

The boring of the opposite lug 3 is carried out in the same way; however, the welding head 25 and the lathe head 31 are then mounted on an extension of the driving spindle 33. This extension can be kept in the intermediate bearing 16 so that each of the bearing lugs 3 and 4 can be coated with excess material and the excess material can be removed after a single centering of the device 15.

Thereafter, the straps 11 to 14 are detached and, if necessary, a repaired or exchanged bearing bolt 7 with the accompanying bearing arm 6 is set in again. The repaired bolt bearing is properly centered and has very solid bearing lugs 3 and 4 because it is preferred to use a very hard material.

The lathe head 31 can be a conventional lathe head for the making of boreholes. The welding head 25 is constructed in such a way that it fits on the driving spindle when it replaces the lathe head 31; this will be explained in greater detail with reference to FIGS. 8 to 13.

Figure 8:
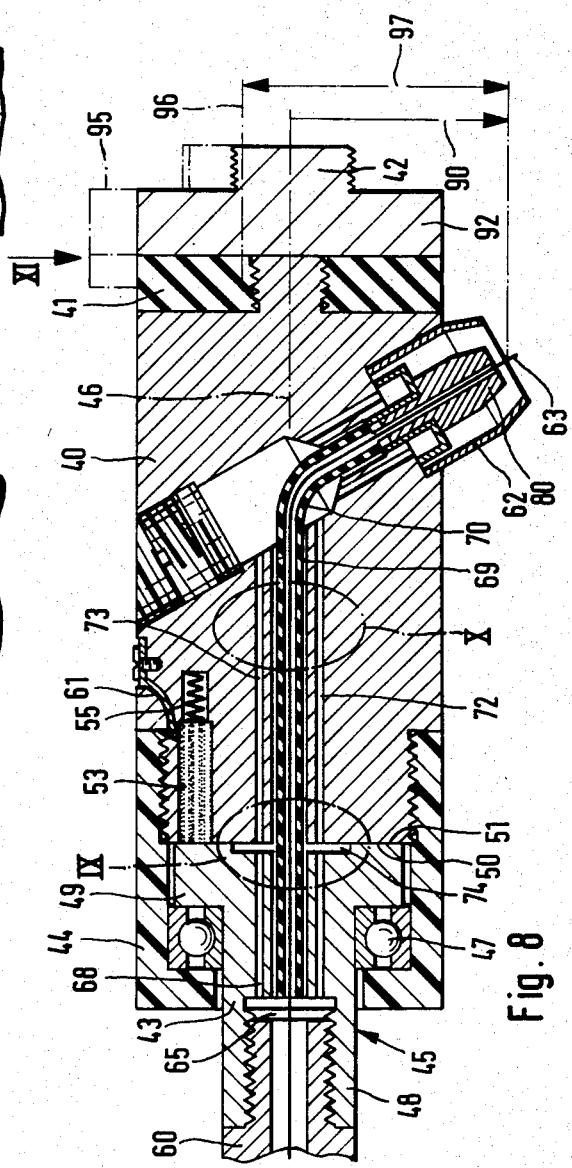
FIG. 8 is a cross-sectional view of a welding head.

The welding head 25 comprises a metallic electrically conducting carrier 40 having a substantially circular cylindrical shape. One end of the carrier 40 is connected with an electrical insulating junction coupling 41 having a coupling element 42 which fits on the free end of the driving spindle 33. The other end of the carrier 40 is connected to a shaft coupling 43 whose end portion can rotate about the axis 46 of the carrier 40 and is located in a bearing 47 in the interior of an insulating fixture 44 which is coupled with the carrier and is made from electrically insulating material. The portion 45 of the coupling 43 comprises a shaft 48, whose end extends from the carrier 40, and a flange 49 which is integral with the shaft 48. The end face 50 of the flange 49 is located opposite the end face 51 of the carrier 40 and extends at right angles to the axis 46. The portion 45 consists of electrically conducting metal, the same as the carrier 40. In order to establish electrical contact between the flange 49 and the carrier 40, several carbon brushes are arranged at the circumference of the flange; FIG. 8 shows one carbon brush 53 disposed in parallel to the axis 46 and being under the bias of a compression spring 55 so that it is longitudinally movable against the end face 50. The carbon brushes are directly conductively connected with the carrier 40 by means of electrical connections. A flexible supply hose or conduit 60 which is screwed into the shaft 48 serves as anode leader for the welding current which is supplied to the welding nozzle 80 by way of the portion 45, the carbon brushes, for example the carbon brush 53, the lead-in 61 of the carbon brush and the carrier 40.

An insulating tube 68 is installed coaxially in the portion 45 and coaxially surrounds a welding rod or wire 63 which passes through the supply conduit 60. The welding rod 63 extends to the welding nozzle 80.

A duct 69 is fitted into the carrier 40 and is aligned with the shaft 48 or rather with the center duct 68. The duct 69 is bent in one direction radially of the carrier axis 46. An insulating tube 70 in the carrier duct 69 serves as electrical insulation for the welding rod or wire 63 and its internal surface is smooth in order to facilitate the guiding of the welding rod or wire 63 along the curve of the casing duct by causing the welding rod to slide therein.

Next to the casing duct 69, there are provided in the carrier 40 gas ducts 72, 73 through which the protective gas streams from the supply hose 60 to the gas nozzle 62. The rear ends of the gas ducts 72, 73 extend to the end face 50 of the flange 49 which has an annular recess 74 to allow for the flow of the protective gas into the gas ducts 72, 73.

The inner welding nozzle 80 of the nozzle 62 directs the welding wire or rod 63 to the weld point. This welding nozzle is surrounded by a protective gas sheath 82 to form a protective gas duct or passage 83 which extends between the welding nozzle and the gas duct 72 and whose outlet points toward the weld point 81. The gas ducts or channels 72, 73 which serve to supply the protective gas lead into this protective gas duct. A deflecting member or shock-plate 85 is located opposite the channels 72, 73 and forms part of a shock-ring 86 having an annular portion 87 abutting against a wall 89 of the carrier 40. The ring 87 has openings 88 through which the protective gas can stream radially outwardly into the protective gas duct 83. Because the openings 87 are arranged at its circumference, the ring 86 protects the weld point of the welding wire or rod 63 from untimely oxidation.

As indicated in FIG. 8 by the arrow 90, the distance between the welding nozzle 80 and carrier axis 46 has to be adjusted in correspondence with the radius of the lug to be repaired so that, in the course of the welding operation, the welding nozzle is held at an appropriate distance from that part where the material is to be applied. In order to adjust the welding nozzle in such direction, it could be telescoped into the carrier. Alternatively, variously dimensioned carriers could also be used. However, the simplicity and versatility are increased if the junction coupling 41 allows for adjustability in a manner as shown in FIG. 11. Thus, the junction coupling 41 consists of two parts 91, 92 which are adjustable relative to one another by means of a dovetail guide 93 in the direction of the arrow 90 as well as in the opposite direction, and can be locked to one another by means of a grub screw 94 in the adjusted position. As shown in FIG. 8, the junction coupling 41 is detached and its parts 91, 92 are coaxial. Consequently, the gas nozzle 62 has a minimal axial distance according to arrow 90. Should this distance be increased, part 92 is moved relative to the part 91, for example, up to the position outlined by the phantom lines 95. The axis 96 around which the welding head turns during operation then does not coincide with the axis 46. The axis 96 determines the distance of the welding head which now, according to arrow 97, is larger as a result of staggered arrangement than arrow 90.

During the welding operation, just like during the turning operation, the welding head is rotated about the axis 46 or about an axis 96 which is parallel to the axis 46, and with this the welding head is pushed foward during each revolution to form a fillet layer consisting of a coiled fillet. On the way back or after a start from the beginning, a second fillet layer can be applied, and so on. If the distance of the welding head is to be adjusted from fillet layer to fillet layer, this can be done by means of the dovetail guide of FIG. 11.

I claim:

1. Apparatus for inner lining metallic bearing lugs which are held at a standstill during treatment, comprising an elongated rotary electrically conductive carrier; a welding nozzle mounted on and having an axis which is inclined relative to the axis of said carrier; an axially movable electrically conductive coupling adjacent to the coaxial with said carrier so that said nozzle orbits about the axis of said carrier when the latter rotates and the nozzle simultaneously moves in the axial direction of said carrier as a result of axial movement of said coupling; conduit means for admission of protective gas to said nozzle, said conduit means being connected to said coupling, said carrier having a duct extending from said coupling to said nozzle and at least one channel for conveying gas from said conduit to said nozzle; a protective hose installed in said duct; a welding wire slidably extending through said hose and into said nozzle; and means for electrically connecting said carrier with said coupling and with the wire in said nozzle.

2. The apparatus of claim 1, wherein said conduit constitutes a conductor for welding current.

3. The apparatus of claim 1, further comprising an insulating sleeve affixed to said carrier and rotatably surrounding said coupling.

4. The apparatus of claim 1, wherein said carrier and said coupling have abutting end faces and one of said end faces has a recess which establishes a path for the flow of protective gas from said conduit to said channel.

5. The apparatus of claim 1, wherein said channel has a discharge end and said nozzle includes a protective gas sheath, an inner portion surrounded by and defining with said sheath a passage for the flow of protective gas to the wire, and a deflecting member installed in said passage and having an end wall facing the discharge end of said channel and a circumferentially complete wall having openings for the flow of protective gas from the discharge end of said channel into said passage.

6. The apparatus of claim 1, wherein said carrier has first and second end portions and said coupling is adjacent to one of said end portions, and further comprising a second coupling provided at the other end of said carrier and means for transmitting to said carrier torque by way of said second coupling, said second coupling being adjustable transversely of the axis of said carrier.

7. The apparatus of claim 1, further comprising a lathe and a second coupling for transmitting torque from said lathe to said carrier.

* * * * *